Re. 24336

Aug. 5, 1952 G. W. FYLER 2,606,247

AUTOMATIC GAIN CONTROL

Filed Aug. 15, 1947 3 Sheets-Sheet 1

Inventor
GEORGE W. FYLER
By Foorman L. Mueller
Atty.

Aug. 5, 1952

G. W. FYLER 2,606,247

AUTOMATIC GAIN CONTROL

Filed Aug. 15, 1947

3 Sheets-Sheet 2

Inventor
GEORGE W. FYLER

By Foorman L. Mueller

Atty.

INVENTOR.
George W. Fyler
BY
[signature]
Atty.

Patented Aug. 5, 1952

2,606,247

UNITED STATES PATENT OFFICE 2,606,247

AUTOMATIC GAIN CONTROL

George W. Fyler, Lombard, Ill., assignor to Motorola, Inc., Chicago, Ill., a corporation of Illinois Application August 15, 1947, Serial No. 768,855

4 Claims. (Cl. 178—7.5)

This invention relates generally to automatic gain control systems and more particularly to an automatic gain control system for a television receiver in which the control is independent of the black content of the picture signal.

In the prior art various attempts have been made to provide automatic volume or gain control systems for use in television receivers to prevent slow and fast fading and also to facilitate station switching and otherwise improve the control of the receiver. In such systems it is desirable that a control voltage be provided which varies with the signal strength of the received carrier signal but which is substantially independent of the picture characteristics of the modulating video signal. By picture characteristics is meant the relative blackness or whiteness of the picture which is indicated by the amplitude of the video signal. This characteristic may also be referred to as "black content" of the picture signal; that is, the portion of the picture elements in which the amplitude of the signal corresponds to a black part of the picture. A satisfactory automatic gain control must distinguish between change in carrier signal strength due to varying transmission efficiency and change in video signal amplitude due to difference in darkness of the picture, as the first is to be eliminated and the latter should be retained.

Automatic gain control systems such as used in the usual radio receivers are not suitable for television receivers as the picture signal varies through wide ranges of amplitude depending upon the nature of the object, that is, the amount of black in the picture, and such gain controls would reduce this range in amplitude cutting down the contrast in the picture. Systems have also been used in which the signal strength of the synchronization pulses are used to provide voltages for automatic gain control. These systems have not been entirely satisfactory both because they are affected by noise pulses and because they require additional tubes and are, therefore, relatively complicated and expensive.

It is, therefore, an object of the present invention to provide a simple and effective automatic gain control system for a television receiver.

It is a further object of this invention to provide an automatic gain control system for a television receiver in which the control is independent of the picture characteristics of the television video signal.

Another object of this invention is to provide an automatic gain control which is not critical in operation and which controls the gain to take care of a small change in signal strength, A feature of this invention is the provision of an automatic control system for a television receiver in which the voltages appearing in the receiver are combined to provide a control voltage which corresponds to the carrier signal strength and is substantially independent of the picture characteristics of the video signal.

A further feature of this invention is the method of combining the voltages across the detector load of the television receiver which varies directly with the black content of the picture and the voltage on the grid of the clipper tube which varies inversely with the black content of the picture to provide an automatic gain control voltage which is substantially independent of the picture characteristics.

A still further feature of this invention is the provision of an automatic gain control circuit for a television receiver including a potentiometer having one end terminal connected to the high voltage side of the detector load resistor and the other end terminal connected to the grid of the clipper tube with the movable center tap connected to the intermediate frequency amplifier to provide a voltage for controlling the gain thereof.

Further objects, features and advantages will be apparent from a consideration of the following description taken in connection with the accompanying drawings in which.

In practicing the invention there is provided a superheterodyne television receiver which may be of any suitable design such as that shown in my copending application, subject "Television Receiver," Serial No. 696,129, filed September 11, 1946, now Patent No. 2,458,365. This receiver includes an intermediate frequency amplifier, a detector including a load resistor across which the video signal is developed, an amplifier for amplifying said video signal, and a clipper for deriving the synchronization pulses from the composite video signal. In accordance with the invention means for controlling the gain of the intermediate frequency amplifier in accordance with the level of the received carrier is provided which comprises combining the voltage appearing across the load resistor of the detector and the voltage appearing on the grid of the clipper tube to provide a voltage which varies with the level of the video carrier but which is substantially independent of the picture characteristics of the modulating signal. As the voltage on the detector load varies directly with the black content of the picture signal, and the voltage on the grid of the clipper varies inversely as the black content of the picture, these two voltages can be combined to provide a voltage in which the variation due to black content of the picture is balanced out.

Figure 1:
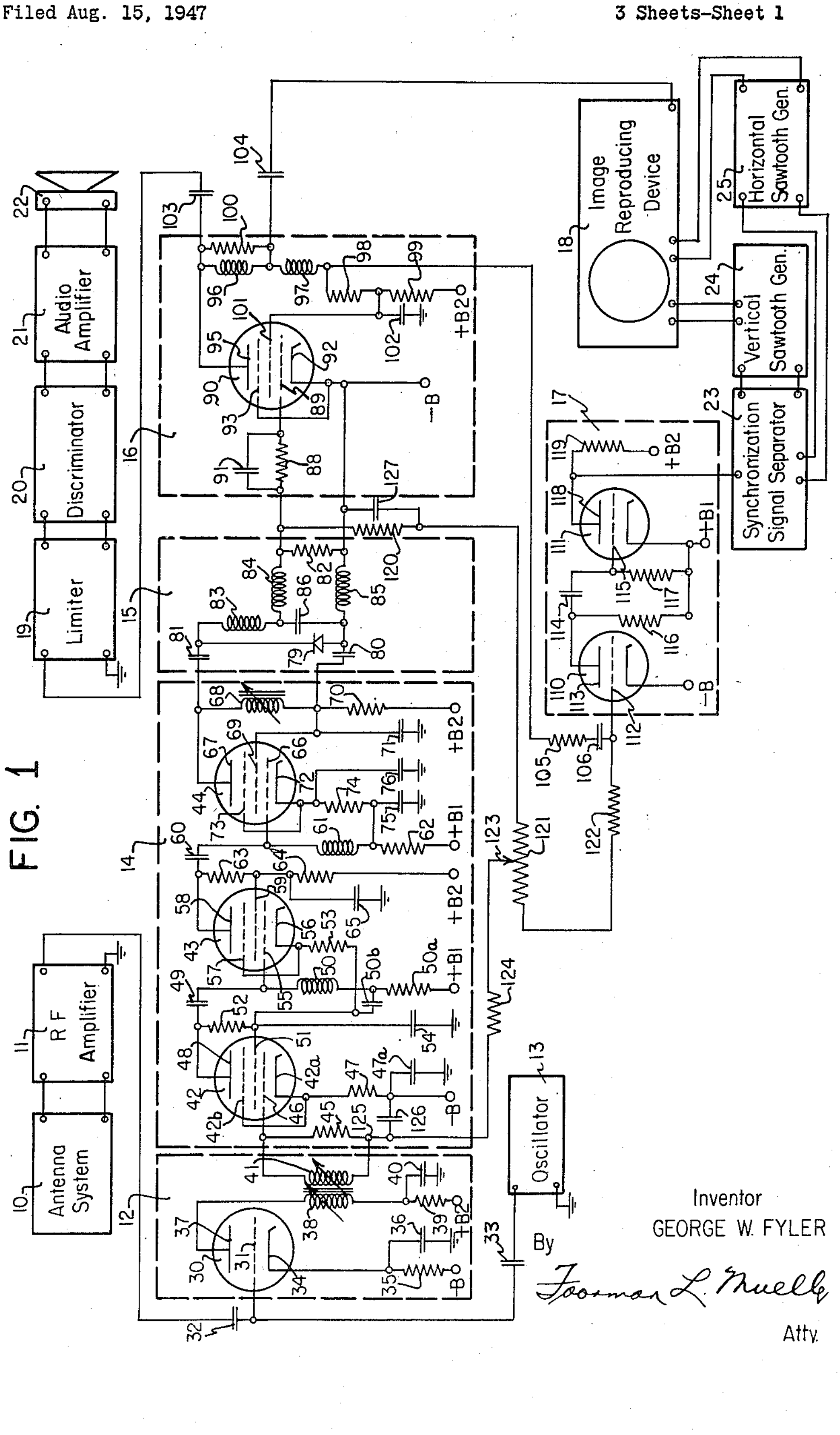
Fig. 1 is a circuit diagram shown partly as a block diagram illustrating the automatic gain control system of the invention.

Referring now to Fig. 1 the circuit diagram of a television receiver of the superheterodyne type is shown with certain of the components shown in block diagram and with such components shown in detail as are necessary for a complete understanding of the invention. The antenna system 10 is adapted to intercept incoming modulated carrier signals and apply them to radio frequency amplifier 11 wherein signals of the desired frequency are selectively amplified. The amplified signals are applied to converter 12 where they are heterodyned with signals from the oscillator 13 to produce signals of intermediate frequency. The intermediate frequency signals are applied to intermediate frequency amplifier 14 wherein the signals are further selected and amplified. For deriving the video signal from the intermediate frequency signal, the detector 15 is provided. The video signal is then amplified in video amplifier 16 and applied to clipper 17 and image reproducing device 18 in the usual manner.

Although the receiver in accordance with the invention may be of any well known type, in the circuit disclosed the intermediate frequency amplifier 14 amplifies both the audio and video intermediate frequency signals with the audio signals being heterodyned with the video signals in the detector 15 and further amplified in video amplifier 16. After being amplified in the video amplifier 16, the audio signal is separated from the video signal and applied to limiter 19, discriminator 20, audio amplifier 21 and sound reproducing device 22 all of which function in a well known manner.

The synchronization signals are removed from the composite video signals by the clipper 17 and applied to synchronization signal separator 23 which separates the vertical and horizontal pulses applying the vertical pulses to the vertical sawtooth generator 24 and the horizontal pulses to the horizontal sawtooth generator 25. The vertical and horizontal sawtooth generators may be either current or voltage generators depending upon whether electromagnetic or electrostatic deflection is used in the image reproducing device 18. Systems utilizing both electromagnetic and electrostatic deflection are well known in the art. The vertical and horizontal sawtooth generators are held in step by the synchronization pulses so that picture represented by the video signal is reproduced by the image reproducing device.

For a complete understanding of the invention a detail description of the structure of the converter 12, intermediate frequency amplifier 14, detector 15, video amplifier 16 and clipper 17 will be given hereinafter. The converter 12 includes a tube 30 having a control grid 31 which is coupled to the radio frequency intermediate amplifier 11 by condenser 32 and to the oscillator 13 by condenser 33. The cathode 34 of the tube 30 is connected to minus B by resistor 35 and is by-passed by condenser 36. For providing operating potential to the tube 30, the plate 37 thereof is connected through inductor 38 and resistor 39 to a source of potential marked plus B2, the resistor 39 being by-passed by condenser 40. The inductor 38 is variable to tune the plate circuit and is inductively coupled to an inductor 41 which applies the signal to the intermediate frequency amplifier 14.

The intermediate frequency amplifier 14 includes pentode tubes 42, 43 and 44 which are arranged in cascade with the plate of each tube being coupled to the grid of the next succeeding tube. The output of the converter 12 is applied from inductor 41 to resistor 45 which is connected to the grid 46 of the pentode tube 42. The cathode **42*a* and suppressor grid 42*b* of the tube 42 are connected to the minus B buss through resistor 47. For by-passing radio frequency currents condenser 47*a* is provided. As previously stated, the plate 48 of the tube 42 is coupled to the grid 55 of the tube 43, the connection being made through coupling condenser 49. For tuning the plate circuit of tube 42, an inductor 50 is provided which is connected between the coupling condenser 49 and a source of potential marked plus B1 through resistor 50*a*. Resistor 50*a* is connected to the screen grid 51 of tube 42 by condenser 50*b*. The tubes 42 and 43 are effectively connected in series for direct currents with the plate 48 and screen grid 51 of tube 42, being connected through resistors 52 and 53 to the cathode 56 and suppressor grid 57 of tube 43. Therefore, a series flow of current is provided through the tubes and the bias of tube 42 will control the gain of both tubes. A radio frequency by-pass for the screen grid 51 is provided by condenser 54. The plate 58 of the tube 43 is coupled to the grid 66 of tube 44 by coupling condenser 60 with the plate circuit of tube 43 being tuned by inductor 61 which is connected through resistor 62 to a source of potential marked plus B1. For providing operating potentials for the tubes 42 and 43 in series, the plate 58 and screen grid 59 of tube 43 are connected to a source of potential marked plus B2 through resistors 63 and 64, the condenser 65 providing a radio frequency by-pass for the screen grid 59. For tuning the output circuit of tube 44 a variable inductor 68 is connected to the plate 67. Operating potential is provided to the plate 67 and screen grid 69 through resistor 70 which is connected to the source of potential plus B2, the screen grid 69 being by-passed by condenser 71 in the usual manner. The cathode 72 and suppressor grid 73 of the tube 44 are connected to the source plus B1 through resistors 62 and 74 which are by-passed by condensers 75 and 76. It will be noted that operating potentials are provided for tube 44** between the power supply indicated plus B1 and the power supply plus B2, the voltage of plus B2 being substantially greater than that of plus B1.

The amplified intermediate frequency signals are applied from the tube 44 to detector 15, being coupled to the rectifying element 79 thereof through condensers 80 and 81. The detected video signal and the audio signal which is heterodyned in the detector to provide a carrier frequency equal to the difference between the audio and video carriers, appear across load resistor 82 of the detector 15 and are applied therefrom to the video amplifier 16. The audio signal is very small and has no direct current component so that the direct current value of the detected video signal is not affected thereby. Inductors 83, 84 and 85 and condenser 86 form a low pass filter for removing the intermediate frequencies and harmonics thereof from the signal applied to the video amplifier.

The video signal derived by detector 15 is applied to the video amplifier 16 being applied from the load resistor 82 of the detector through resistor 88 to grid 89 of the video amplifier tube 90. The resistor 88 is provided to reduce the effect of contact potential of the video amplifier on the detector. Condenser 91 is provided for passing the audio and video signals. The video amplifier is operated at fixed gain so it is desired that the input thereto be limited to a relatively small range of values. The cathode 92 and suppressor grid 93 of the video amplifier tube 90 are connected to minus B and the plate 95 is connected to an output circuit from which audio signals are applied to the limiter 19 and video signals are applied to the clipper 17 and image reproducing device 18. More specifically, the output circuit includes inductors 96 and 97 and resistors 98 and 99 all connected in series between the plate 95 and a source of potential indicated as plus B2, the inductor 96 being shunted by resistor 100. Potential is applied to the screen grid 101 of tube 90 through resistor 99 which is by-passed by condenser 102. The audio signals are applied to the limiter 19 through coupling condenser 103 which forms a series resonant circuit to ground tuned to the carrier frequency of the audio signals. The video signals are applied to image reproducing device through coupling condenser 104 and to the clipper 17 through resistor 105 and condenser 106. The coupling components are selected to compensate for the capacities of the image reproducing device and clipper so that the video amplifier operates at maximum gain.

The clipper 17 includes tubes 110 and 111 arranged in cascade with the signal being applied from the video amplifier to the grid 112 of the tube 110. The amplified signal from the plate 113 of this tube is provided through coupling condenser 114 to the grid 115 of tube 111. It is to be noted that the tube 110 is connected between B1 power supply and minus B and the tube 111 is connected between plus B2 and plus B1. More specifically, plate potential is provided to plate 113 of tube 110 from plus B1 through resistor 116. The grid 115 of tube 111 is biased by resistor 117 and plate potential is provided to the plate 118 thereof through resistor 119.

For providing automatic gain control in the receiver, a circuit is provided for applying a variable bias to the grid 46 of the first intermediate frequency amplifier tube 42. This circuit comprises resistor 120, potentiometer 121 and resistor 122 all connected in series from the high voltage side of the detector load resistor 82 to the grid 112 of the clipper 17. The potentiometer 121 has a movable contact 123 connected through resistor 124 to the low voltage terminal 125 of the biasing resistor 45 for the grid 46 of tube 42. Due to the series flow of current through tubes 42 and 43, the varying bias is effective to change the gain of both tubes. A condenser 126 connected between terminal 125 and ground reduces the video and synchronization signal modulation components so that the automatic gain control circuit is not affected thereby. An additional filtering condenser 127 is provided across resistor 120 to prevent radio frequency currents from the high voltage supply from affecting the detected video voltage as amplified and applied to the picture tube.

Considering now the operation of the automatic gain control circuit, it is well known that the voltage appearing across the detector load resistor 82 depends upon the amplitude of the received carrier wave and the picture characteristics or black content of the picture element of the video signal. The audio signal is very small and does not contribute to the direct current value of the detected video signal. This voltage is always negative and varies from maximum value for a solid black picture to a minimum voltage on a solid white picture. The signals appearing across the diode load resistor 82 are represented by the curves of Fig. 4. The portion C represents an average signal and the D. C. component or average value of the signal is represented by the broken line *c*. The portion D represents a signal corresponding to a light picture and it is apparent that the D. C. component is much smaller as indicated by the line *d*. The portion E represents a signal corresponding to a relatively dark picture and has a relatively large D. C. component. It is, therefore, apparent that the voltage appearing across the diode load resistor is maximum for a black picture and minimum for a white picture. This characteristic is represented by curve A in Fig. 2.

Figure 5:
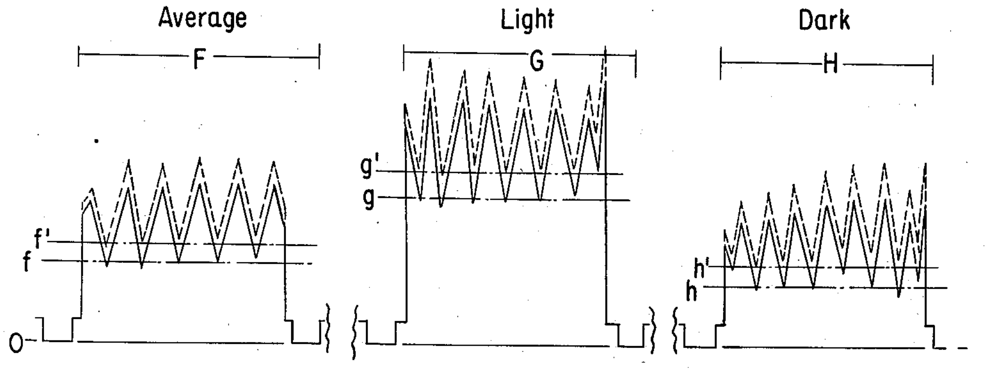

The voltage on the grid 112 of the clipper 17, however, varies in the opposite manner, that is, the voltage is a minimum for a black picture and maximum for a white picture. This is because the clipper is connected through resistor 105 and condenser 106 which removes the direct current component of the signal. The signal biases itself back from the peaks of the synchronization pulses which are in the black region and, therefore, the voltage on grid 112 is maximum for a white picture. The voltages appearing at the grid of the clipper tube are illustrated by the curves of Fig. 5. In Fig. 5 the portions F, G and H illustrate voltages corresponding to pictures which are average, light and dark respectively. The average values of these voltages are represented by the lines *f*, *g* and *h* respectively. It is apparent from these curves that at the clipper grid the voltage is maximum for a white picture and minimum for a dark picture being negative in all cases.

Considering Figs. 4 and 5 together, when the signal across the detector load is small, the voltage on the clipper grid is large, and vice versa. It is to be noted, however, that Figs. 4 and 5 do not show the values of the voltage at the detector load and the voltage at the clipper grid to scale. The relative values of the voltages at the detector load and the clipper grid are illustrated by the curves A and B of Fig. 2. Figs. 4 and 5 show the changes in the voltages at the detector load and clipper grid with changes in the black content of the picture being received. From a consideration of all these curves, it is seen that the two voltages may be combined to provide a voltage which is substantially independent of the picture characteristics, or black content, of the video signal. It is to be pointed out that only the direct current component or average value of the voltages are used to provide the automatic gain control voltage. The resistor 124 and condenser 126 through which the control voltage is applied to the amplifier stages is effective to filter out all high frequency components. Likewise, the resistor 105 together with the grid-cathode capacity of the clipper tube 110 filter high frequency components from the signal at the clipper grid.

The voltages on the detector load and on the clipper grid are combined by resistors 120 and 122 and potentiometer 121 connected between load resistor 82 and the grid 112 of the clipper tube which form a voltage divider, with each of the voltages having some effect on the voltage at any point on the divider. It is obvious that at some point along this voltage divider the variations in the diode load voltage will balance the variations in the clipper input voltage so that a voltage will be produced which is substantially independent of the black content of the picture being received, or the picture characteristic of the video signal. This is represented by the dotted curve marked B in Fig. 2 in which the magnitude of the voltage from the clipper is reduced with respect to that from the diode load. In actual practice the diode load voltage will have an average value of the order of 1 to 1½ volts and the clipper grid will be held at an average voltage ranging from 10 to 18 volts. In each case the voltage is negative and it has been found that by proper choice of the decoupling resistors 120 and 122 and the potentiometer 121 the varying characteristic of the picture signal will be substantially balanced out at a point having a potential of about minus 2 to 3 volts. This automatic gain control potential is applied through resistor 124 to the terminal 125 and is adequate for controlling the gain of the intermediate frequency amplifier. It is to be pointed out that for weak radio frequency signals the voltage across both the load resistor 82 and the clipper will be less and the automatic gain control voltage will be less so that the gain of the intermediate frequency amplifier will be increased.

In Figs. 4 and 5 the solid lines illustrated signals having different light content but produced by a given carrier strength. The dotted lines illustrate corresponding signals when the carrier is of greater strength. The line *c'*, *d'*, *e'*, *f'*, *g'*, and *h'* indicate the average values of these signals and are always of greater magnitude than the corresponding average values *c*, *d*, *e*, *f*, *g*, and *h* produced by the weaker carrier signals. It, therefore, is apparent that when these signals are combined in the manner illustrated in Fig. 1, the negative bias is proportional to the strength of the carrier signal and is effective to control the gain so that the video output remains substantially constant for wide changes in picture strength as shown in Fig. 3.

Figures 2, 3:
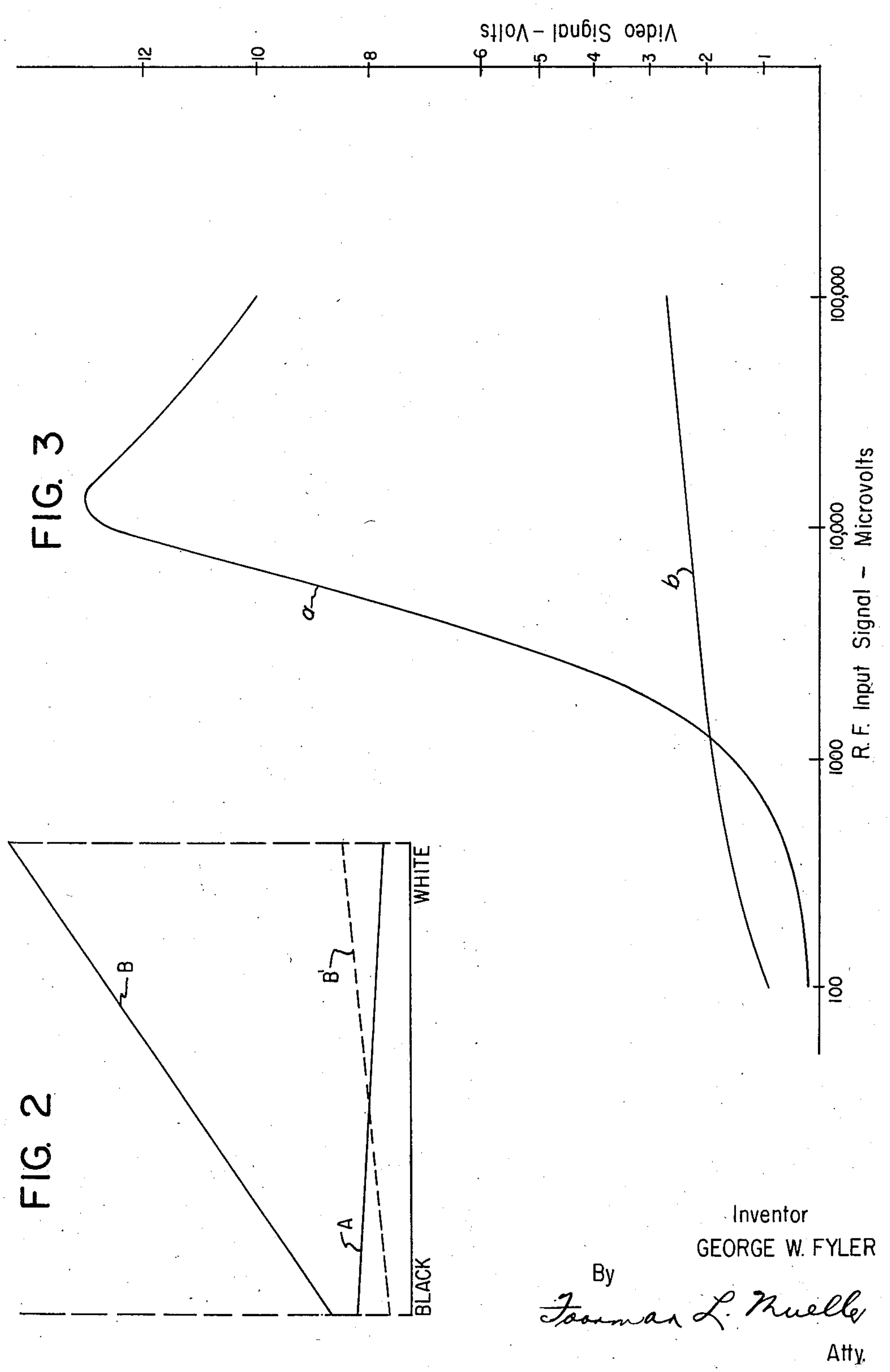
Fig. 2 is a chart showing the voltages across the detector load and the clipper input.
Fig. 3 illustrates the control of the video signal by the automatic gain control circuit.
Figure 4:
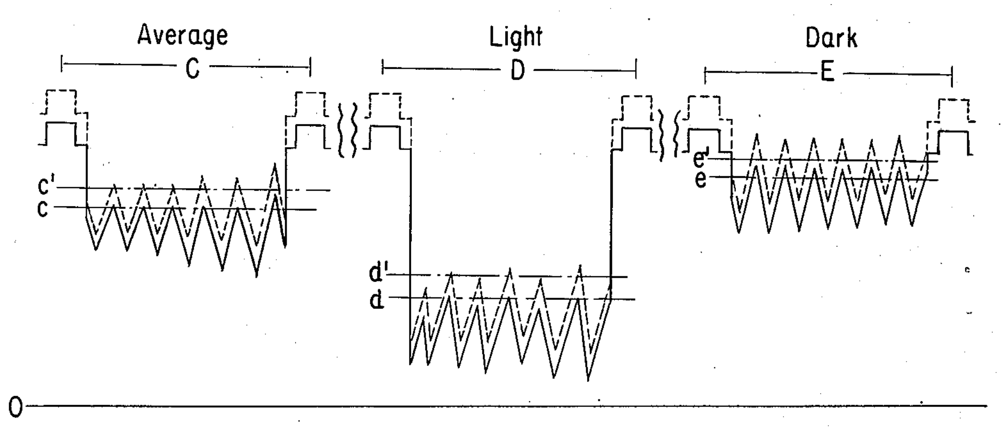
Figs. 4 and 5 illustrate representative video signals appearing across the detector load and at the clipper input respectively.

The effectiveness of the automatic gain control circuit is illustrated in the curves shown in Fig. 3. In this figure the voltage of the video signal developed across the load resistor of the detector is shown plotted against the strength of the radio frequency input signal. Curve *a* is for a circuit as above described in which an automatic gain control is not provided. It is noted that the voltage becomes very high for radio frequency signals in the region between 10,000 to [illegible]0,000 microvolts. It is apparent that the variation in signal strength provides a great variation of the video signal so that fading would produce an objectionable effect. Curve *b* in Fig. 3 illustrates the voltage across the detector load with the automatic gain control circuit in accordance with the invention in operation. It is noted that the video signal voltage is relatively flat for radio frequency inputs ranging from 1,000 to 50,000 microvolts which would cover the normal operating range of a television receiver. Thus the automatic gain control circuit will be very effective to overcome present difficulties caused by both slow and fast fading and will also facilitate switching of the receiver from one station to another, making such switching possible without changing the volume or contrast control.

With reference to the circuit of Fig. 1, the potentiometer 121 serves as the contrast control for the receiver. As previously stated at only one setting of the movable contact 123 will the effect of the light content of the picture be completely balanced out. However, due to the flatness of the automatic gain control curve, this point does not change rapidly. It has been found also, that a relatively wide range of contrast control is possible which still provides satisfactory automatic gain control, and the curve of Fig. 3 showing the form of the video voltage with the automatic gain control circuit in operation may be considered represented through a fairly wide range of operation of the contrast control.

In systems actually constructed using the automatic gain control circuit in accordance with the invention, very satisfactory operation has resulted. Although the circuit is not limited to specific values, in the systems actually constructed the following values were used for the components relating most directly to the automatic gain control:

| | |
|---|---|
| Detector 79 | 1N34. |
| Load resistor 82 | 6800 ohms. |
| Decoupling resistor 120 | 33,000 ohms. |
| Condenser 127 | .005 microfarad. |
| Potentiometer 121 | 2 megohms. |
| Decoupling resistor 122 | 100,000 ohms. |
| Resistor 105 | 10,000 ohms. |
| Condenser 106 | .05 microfarad. |
| Tube 110 | 12SN7-GT (one section). |
| Coupling resistor 124 | 2.2 megohms. |
| Condenser 126 | .25 microfarad. |
| Resistor 45 | 4700 ohms. |

While particularly good results are obtained by coupling the automatic gain control circuit to both the detector load and the clipper grid, it is pointed out that a satisfactory automatic gain control voltage can be obtained by coupling only to the clipper grid. In such a system one end of the potentiometer may be grounded and a portion of the voltage on the clipper grid applied to the intermediate frequency amplifier through the potentiometer in the manner illustrated.

It is seen from the above that a very simple circuit for automatic gain control of a television receiver is provided which requires a relatively few additional components and, therefore, does not add appreciably to the cost of the set. The gain control provided is very effective being substantially independent of the picture characteristics of the video signal and provides adequate gain control as shown by the accompanying drawings.

While there is described one embodiment of my invention which is illustrative thereof, it is obvious that various changes and modifications can be made therein without departing from the intended scope of the invention as defined in the appended claims.

I claim:

1. A superheterodyne television receiver including in combination, an intermediate frequency amplifier for selecting and amplifying a carrier wave modulated by a video signal, a detector for deriving the video signal from said modulated carrier wave, said detector including rectifying means and a load impedance having one terminal thereof connected to a reference potential and a second terminal at which said video signal is developed, said rectifying means having such polarity that the average direct current potential at said second terminal is negative with respect to said reference potential and varies from a maximum negative value for a signal corresponding to a black picture to a minimum negative value for a signal corresponding to a white picture, video amplifier means coupled to said second terminal of said load impedance for inverting and amplifying said video signal, a circuit coupled to said video amplifier means including an electron discharge valve having a cathode and at least one other electrode with said cathode being connected to said reference potential, means including a condenser coupling said video amplifier means to the other one of said electrodes for applying the video signal thereto, said electron discharge valve providing an average rectified potential at said other electrode which is negative with respect to said reference potential and varies from a minimum negative value for a signal corresponding to a black picture to a maximum negative value for a signal corresponding to a white picture, and a circuit for controlling the amplification of said receiver comprising potentiometer means having end terminals and an intermediate tap, one of said end terminals being connected to said second terminal of said load impedance and the other one of said end terminals being connected to said other electrode, resistance means connected to said intermediate tap and condenser means connected in series with said resistance means and to said reference potential for providing a substantially steady gain control bias across said condenser means which varies with the intensity of said carrier wave, and means applying said gain control bias to said intermediate frequency amplifier for controlling the gain thereof, said tap being adjustable to a position at which said gain control bias is substantially independent of the picture characteristics of said video signal.

2. A superheterodyne television receiver including in combination, an intermediate frequency amplifier for selecting and amplifying a carrier wave modulated by a video signal, a detector for deriving the video signal from said modulated carrier wave, said detector including rectifying means and a load impedance having one terminal thereof connected to a reference potential and a second terminal at which said video signal is developed, said rectifying means having such polarity that the average direct current potential at said second terminal is negative with respect to said reference potential and varies from a maximum negative value for a signal corresponding to a black picture to a minimum negative value for a signal corresponding to a white picture, video amplifier means coupled to said second terminal of said load impedance for inverting and amplifying said video signal, a circuit coupled to said video amplifier means including an electron discharge valve having a cathode and at least one other electrode with said cathode being connected to said reference potential, means including a condenser coupling said video amplifier means to the other one of said electrodes for applying the video signal thereto, said electron discharge valve providing an average rectified potential at said other electrode which is negative with respect to said reference potential and varies from a minimum negative value for a signal corresponding to a black picture to a maximum negative value for a signal corresponding to a white picture, and a circuit for controlling the amplification of said receiver comprising resistance means and condenser means connected in series with said resistance means being connected to said second terminal of said load impedance and said condenser means being connected to said reference potential, potentiometer means having end terminals and an intermediate tap, one of said end terminals being connected to the junction of said resistance means and said condenser means and the other one of said end terminals being connected to said other electrode, second resistance means connected to said intermediate tap and second condenser means connected in series with said second resistance means and connected to said reference potential for providing a substantially steady gain control bias across said second condenser means which varies with the intensity of said carrier wave, and means applying said gain control bias to said intermediate frequency amplifier for controlling the gain thereof, said intermediate tap being adjustable to vary the effect of the picture characteristics on said gain control bias.

3. A superheterodyne television receiver including in combination, an intermediate frequency amplifier for selecting and amplifying a carrier wave modulated by a video signal, a detector for deriving a video signal from said modulated carrier wave, said detector including rectifying means and a load impedance having one terminal thereof connected to a reference potential and a second terminal at which said video signal is developed, said rectifying means having such polarity that the average direct current potential at said second terminal is negative with respect to said reference potential and varies from a maximum negative value for a signal corresponding to a black picture to a minimum negative value for a signal corresponding to a white picture, video amplifier means coupled to said second terminal of said load impedance for inverting and amplifying said video signal, a clipper circuit for deriving synchronization pulses from said video signal coupled to said video amplifier means including an electron discharge valve having a cathode and a grid with said cathode being connected to said reference potential, means including a condenser coupling said video amplifier means to said grid for applying the video signal thereto, said electron discharge valve providing an average rectified potential at said grid which is negative with respect to said reference potential and varies from a minimum negative value for a signal corresponding to a black picture to a maximum negative value for a signal corresponding to a white picture, and a circuit for controlling the amplification of said receiver comprising potentiometer means having end terminals and an intermediate tap, one of said end terminals being connected to said second terminal of said load impedance and the other one of said end terminals being connected to said grid, resistance means connected to said intermediate tap and condenser means connected in series with said resistance means and to said reference potential for providing a substantially steady gain control bias across said condenser means which varies with the intensity of said carrier wave, and means applying said gain control bias to said intermediate frequency amplifier for controlling the gain thereof, said intermediate tap being adjustable for controlling the effect of the picture characteristics of said video signal on said gain control bias, and having one position at which said gain control bias is substantially independent of said picture characteristics.

4. A superheterodyne television receiver including in combination, variable gain amplifier means for selecting and amplifying a carrier wave modulated by a video signal, which video signal varies in amplitude with the black content of the picture being transmitted, a detector including rectifying means and a load impedance having first and second terminals across which the video signal is developed, an electron discharge valve having a cathode and at least one other electrode, means connecting said first terminal of said detector and said cathode of said valve to a reference potential, circuit means coupling said second terminal of said detector to the other one of said electrodes of said valve for applying the video signal thereto, said circuit means including at least one electron discharge valve for inverting said video signal, and including condenser means connected to said other electrode so that the rectified signal appears at said other electrode, and means for controlling the gain of said amplifier means including resistance means having end terminals and an intermediate tap, with said end terminals being connected respectively to said second terminal of said detector and to said other electrode of said valve, resistance means connected to said intermediate tap and condenser means connected in series with said resistance means and to said reference potential for providing a substantially steady gain control voltage across said condenser means which varies with the intensity of said carrier wave, said signal at said second terminal of said load impedance and said signal at said other electrode of said valve having average direct current values which are negative with respect to said reference potential, and which vary with the black content of said video signal and inversely with respect to each other, said tap being adjustable to control the effect of said black content of said video signal on said gain control voltage, and means applying said gain control voltage to said variable gain amplifier means for controlling the gain thereof.

GEORGE W. FYLER.

REFERENCES CITED

The following references are of record in the file of this patent:

UNITED STATES PATENTS

| Number | Name | Date |
|---|---|---|
| 1,997,991 | Barden | Apr. 16, 1935 |
| 2,046,144 | Anders | June 30, 1936 |
| 2,158,261 | Urtel et al. | May 16, 1939 |
| 2,214,287 | Wilson | Sept. 17, 1940 |
| 2,226,366 | Braden | Dec. 24, 1940 |
| 2,240,136 | Geiger | Apr. 29, 1941 |
| 2,240,600 | Applegarth | May 6, 1941 |
| 2,243,423 | Hollingsworth | May 27, 1941 |
| 2,300,115 | Grundman | Oct. 27, 1942 |
| 2,356,140 | Applegarth | Aug. 22, 1944 |
| 2,400,073 | Cawein | May 14, 1946 |
| 2,481,045 | Schroeder | Sept. 6, 1949 |

FOREIGN PATENTS

| Number | Country | Date |
|---|---|---|
| 525,629 | Great Britain | Sept. 2, 1940 |
| 845,897 | France | Sept. 4, 1939 |